April 11, 1944.   A. D. HANSSON   2,346,255
BRAKING DEVICE FOR AIRPLANES
Filed June 30, 1942    3 Sheets-Sheet 1
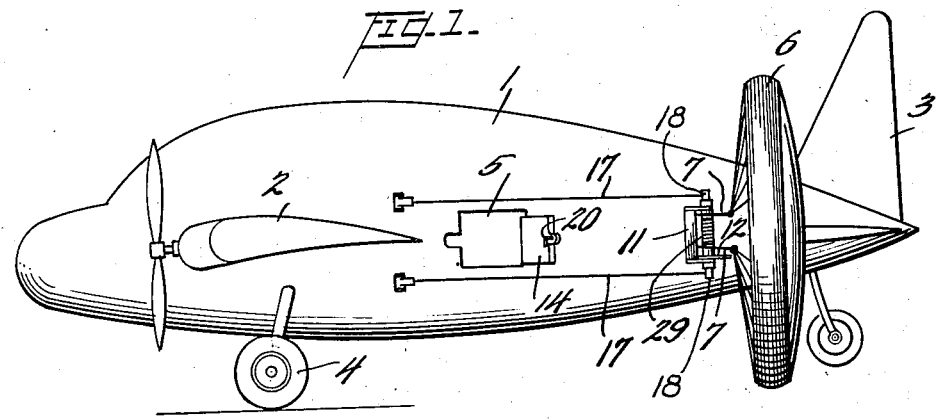
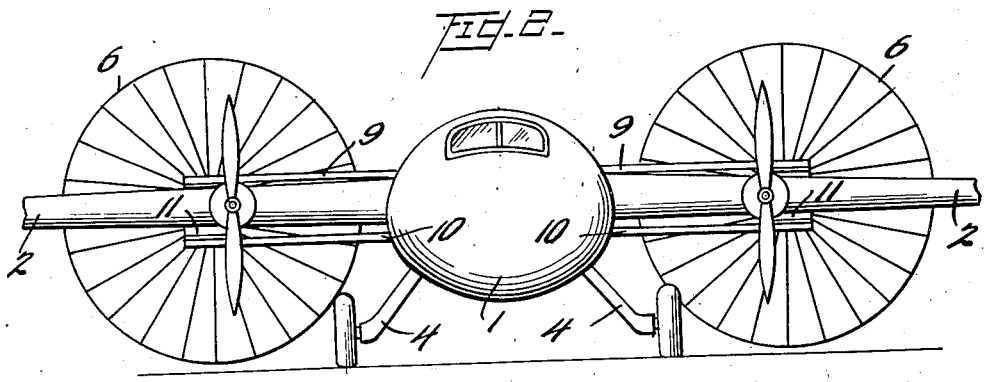
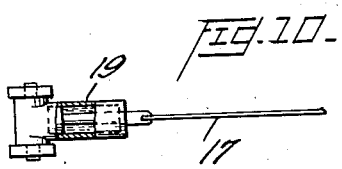
Inventor
Arthur David Hansson,
By Parker Cook,
Attorney

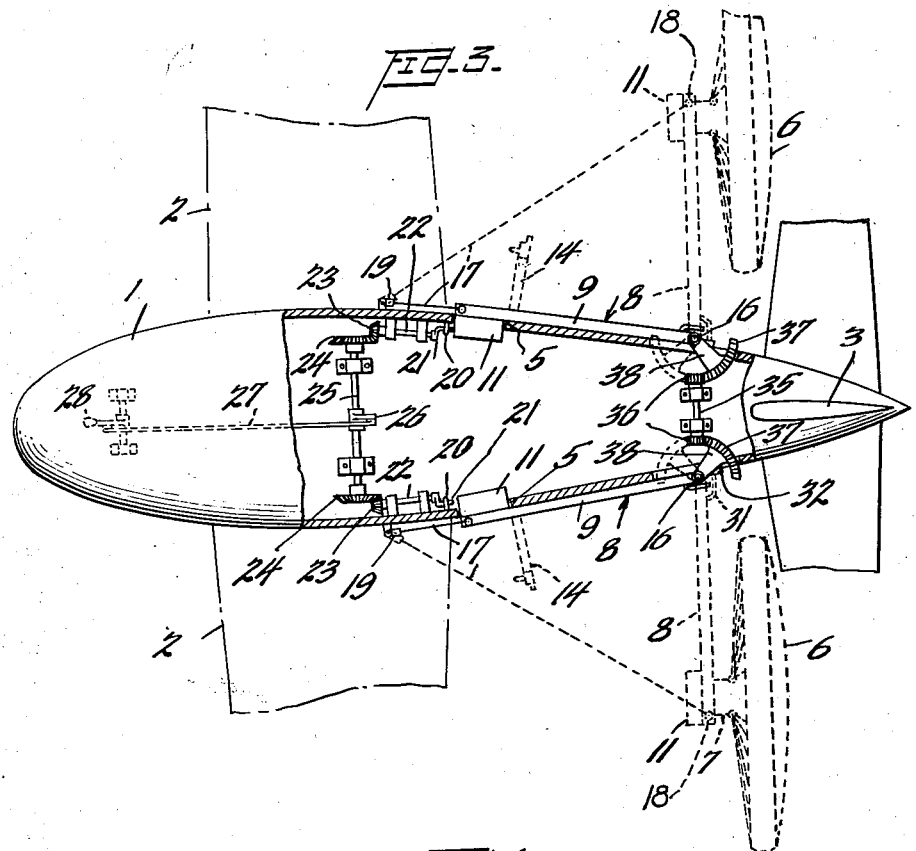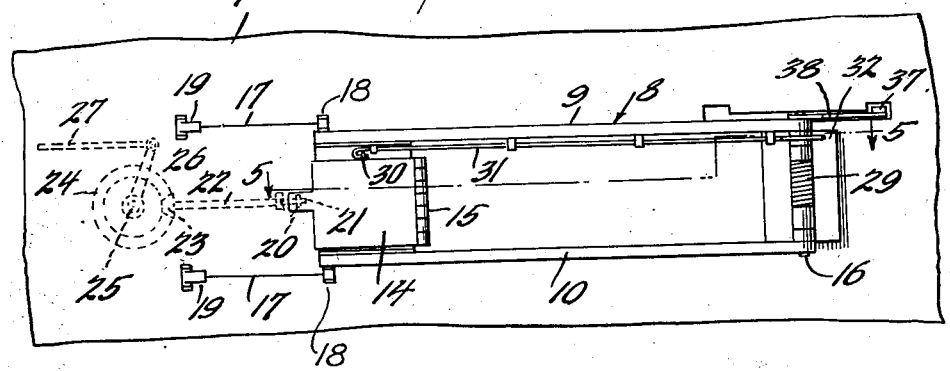

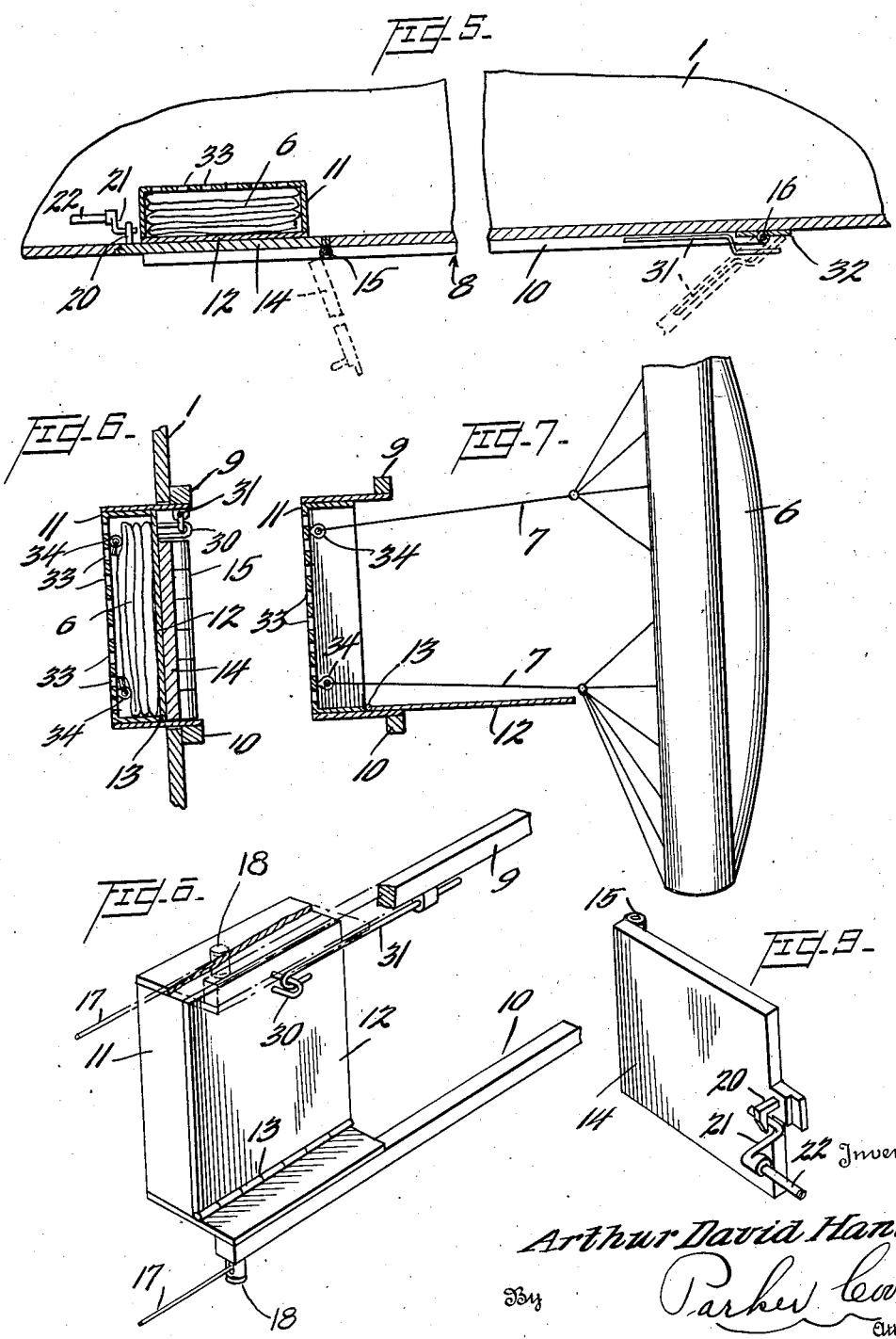
April 11, 1944.  A. D. HANSSON  2,346,255
BRAKING DEVICE FOR AIRPLANES
Filed June 30, 1942   3 Sheets-Sheet 3

Patented Apr. 11, 1944

2,346,255

UNITED STATES PATENT OFFICE 2,346,255

BRAKING DEVICE FOR AIRPLANES

Arthur David Hansson, Shrewsbury, N. J.

Application June 30, 1942, Serial No. 449,128

6 Claims. (Cl. 244—113)

My invention relates to new and useful improvements in airplanes and more particularly to a braking or stopping device which will permit a greater element of safety for forced or emergency landings.

Another object of the invention is to provide a brake which consists generally of two equally spaced drags which are applied at right angles to the longitudinal axis of the airplane and secured at points lying in the plane intersecting the horizontal axis of the fuselage and positioned near the rear or stern so that when these air drags are released by the operator the resistance to the air flow will quickly retard the airplane and at the same time will in no way affect the stability of the airplane as it is being brought to a landing.

Still another object of the invention is to provide two lobe-shaped parachutes which are positioned near the stern of the plane and supported at points lying in the plane intersecting the horizontal axis of the fuselage, both of which drags are to be released in unison by the operator so that there is no possibility of causing the plane during its slowing down action to become directionally unstable.

Still another object of the invention is to provide two air drags that may be quickly and simultaneously released by the operator in an emergency or a forced landing, so that the plane may be stopped in a far quicker time than is now possible.

Still another object of the invention is to provide these drags preferably in the form of lobe-shaped parachutes which will prevent excessive oscillation, and which parachutes are normally packed within their containers which are in turn supported by arms that may be swung out from the plane in an emergency landing.

After the arms have reached a certain position of their opening movement, the air flow will force the lobe-shaped parachutes from their housing and cause them to open and thus bring the plane to a stop in a relatively short period of time.

Still another object of the invention is to provide two drags to act as brakes which are so positioned and held that they will in no way interfere with the stability of the plane in its landing, but on the other hand will provide a means of quickly stopping the plane during its landing operation.

With these and other objects in view, the invention relates to certain new and useful improvements and combination of parts as will be hereinafter more fully described and pointed out in the claims.

In the drawings showing a preferred form,

Fig. 1 is a side elevation of a plane with the air drags in their open or operating position;

Fig. 2 is a front view thereof;

Fig. 3 is a top plan view of the fuselage showing the drags in their packed position, the dotted line showing them in their open position, a part of the structure being broken away for the sake of clearness of illustration;

Fig. 4 is a fragmentary side elevation showing the supporting arms and the housing for the air drags;

Fig. 5 is a sectional view taken on line 5—5 of Fig. 4;

Fig. 6 is a fragmentary view showing one of the drags packed in its housing;

Fig. 7 is a similar view but showing the drag as having been released;

Fig. 8 is a fragmentary enlarged view showing the housing for the drag;

Fig. 9 is a detail perspective showing the outer door; and

Fig. 10 is a detail showing the hydraulic shock absorber for absorbing the shock when the supporting arms are initially swung open.

Referring now to the drawings, and more particularly for the moment to Fig. 1, there is shown that much of an airplane as is thought necessary to illustrate the invention, wherein 1 is the fuselage, 2 is the wings, 3 is the rudder and 4 the landing gear.

There will also be seen an opening 5 in the side of the fuselage in which is fitted the housing of the air drag that will be later mentioned.

Also in Fig. 1 there may be seen the lobe-shaped parachute 6 which will be hereinafter more fully described, which is supported or secured by the drag lines 7 to its housing 11 that will also likewise be mentioned.

Referring now for the moment to Fig. 4, there is shown an arm for supporting the parachute 6 that forms the air drag, and it will be understood that a like arm is on the other side of the fuselage, and that a description of the one is a description of the both.

This arm 8 consists of the upper and lower members 9 and 10, as may also be seen in Fig. 8, while secured to the face thereof is a box-like structure 11 which houses the parachute 6 when not in use.

There may be seen a door 12 which is hinged as at 13, and adjacent thereto when the arms are closed is the outer door 14 which is pivoted on a vertical axis, the hinge being shown as at 15. This door covers the opening 5 when the arm is parallel with the fuselage.

It will be understood that this arm is positioned so that the plane passing through the longitudinal axis of the fuselage coincides with the plane passing through the longitudinal axis of the arm and by so positioning the arm it will not interfere with the stability of the plane.

Secured to the take-up spools 18 on the outer end of the rods or beams 9 and 10 are the cables 17, which are likewise fastened to their respective shock absorbers 19, which are fastened to the fuselage at points slightly behind the plane passing through the center of wing-lift.

Secured to the take-up spools 18 on the outer ends of the rods or beams 9 and 10 are the cables 17, which are likewise fastened to their respective shock absorbers 19, which are positioned at the vertical and longitudinal centers of gravity of the plane.

The outer door 14 is provided with a latch or hook 20 under which fits the bolt 21, which is secured in turn to the rod 22 (see Fig. 9) which rod 22 is provided with a pinion 23 (see Fig. 3) which meshes with a gear 24 mounted on the cross shaft 25. This cross shaft 25 has the arm 26 (see Fig. 4) which is operated by the rod 27 (see Fig. 3) by a handle 28.

Thus, when the pilot operates the handle 28 it will partially revolve the shaft 25 to in turn release the bolt 21 of the outer door 14.

On the pivotal axis pin 16 of the arm 8 there may be seen a spring 29 (see Fig. 4) which will initially spring the arm out slightly from the side of the fuselage when the latch is released, and the door 14 will swing outwardly as shown in the dotted line in Fig. 3.

On the inner door 12 of the housing 11 there may be seen an eyelet or staple 30 which is engaged by the U-shaped end of the arm 31 which extends rearwardly, as may be seen in Fig. 4, so that after the arm 8 has swung partly open, due to the kick of the spring and the rush of air against the same, the distal end of the arm 31 will strike against the plate 32 to release this latch on the door 12 and permit the same to drop down, as may be seen in Fig. 7.

The air rushing through the openings 33 in the front surface of the housing 11 will forcibly eject the parachute 6 from its housing which is held by the drag lines 7, which are securely fastened to the eyelets 34, in the housing 11.

It will be understood that the arms are duplicated on each side of the plane, and that operation of the lever 28 will not only release the door and arm on the left side of the plane (as shown in Fig. 4) but will likewise release the arm and door and parachute on the opposite side of the plane.

Now it is very essential that both the arms 8 open simultaneously or the plane in landing would be prevented from following a straight line.

Therefore, to synchronize the opening of these arms and the release of the parachutes there may be seen in Fig. 3 a small cross shaft 35 with its pinions 36 on its opposite ends, which in turn mesh with gear segments 37, which segments are respectively secured by the arms 38 to the pivot pins 16 of the respective arms 8.

Thus, any movement of the one gear segment by a swinging of an arm 8 will be transferred to the other gear segment, thus assuring that the two arms 8 that support the parachutes will always open in unison.

The shock of these arms swinging back will be taken up by a pneumatic or hydraulic shock absorber, as shown at 19 in Fig. 10, as will be readily understood.

The housings 11 for the parachutes fit within the openings in the side of the fuselage, so that they do not offer any resistance to the air when the plane is in motion, and the parachutes are in their boxed condition.

Thus, by having the arms swung open in synchronism and these arms and supporting cables being arranged as heretofore described, the stability of the plane is in no way affected, and at the same time the drag caused by the parachutes will cause the plane to stop in a far shorter time than heretofore has been found possible with just brakes on the landing gears.

It will be understood, of course, that if a chute is damaged in a forced or emergency landing, it will be replaced with a new one and packed in its housing before the plane makes its next flight.

It will also be understood that the opening mechanism explained and described is for the purpose of illustration, and shows one manner in which the brake may be operated, but I do not wish to be limited to the exact actuating mechanism described.

From the foregoing it will be seen that I have provided two laterally extending braking drags that act as a resistance to the air flow to thus quickly stop the plane when making a forced or emergency landing and due to its great breaking powers, rough terrain will not offer the danger that is present in forced landings at the present time.

It will also be understood that by having the drags open simultaneously from each side of the fuselage and by having these drags situated as heretofore described and held by cables that are likewise situated, the stability of the plane is in no way affected.

It will also be understood that by using the lobe-shaped parachutes, excessive oscillation is prevented. These parachutes might be made of cloth or metal to withstand the flow of air which will be forced against them.

Finally, by providing vents in the housings of the parachutes, the parachutes are automatically opened and the shroud lines being fastened as shown will not foul.

Many slight changes might be made without departing from the spirit and scope of the invention.

Having thus described my invention, what I claim as new and desire to secure by Letters Patent is:

1. In an airplane, two supporting arms pivotally secured to the opposite sides of the fuselage and respectively positioned so that the plane passing through the longitudinal axis of the fuselage coincides with the plane passing through the longitudinal axis of the arm, the said supporting arms also positioned near the rear of the fuselage, air drags carried by said arms and at the outer end of said arms, the air drags normally held within the fuselage, means for releasing said arms and causing said arms to swing outward and release said air drags to thereby provide an air flow resistance on a landing of the airplane.

2. In an airplane, two supporting arms pivotally secured to the opposite sides of the fuselage and respectively positioned so that the plane passing through the longitudinal axis of the fuselage coincides with the plane passing through the longitudinal axis of the arm, said supporting arms positioned near the rear of the fuselage and said arms normally folded against said fuselage, air drags carried at the outer ends of said arms, means for simultaneously releasing said arms to force said air drags to an open position to thereby provide an air flow resistance on the landing of the airplane.

3. In an airplane, two supporting arms pivotally secured to the opposite sides of the fuselage and respectively positioned so that the plane passing through the longitudinal axis of the fuselage coincides with the plane passing through the longitudinal axis of the arm, said supporting arms positioned near the rear of the fuselage and said arms normally folded against said fuselage, and cables secured to said arms and also secured at their opposite ends to the fuselage at points slightly behind the plane passing through the center of wing-lift, housings at the outer end of the arms and air drags carried in said housings, means for simultaneously releasing said arms and means for synchronizing the rearward movement of said arms, the housings having apertures therethrough for allowing the air to force said drags to an open position after the arms have been released to thereby provide an air drag or resistance on the landing of the airplane.

4. In an airplane, two supporting arms pivotally secured to the opposite sides of the fuselage and respectively positioned so that the plane passing through the longitudinal axis of the fuselage coincides with the plane passing through the longitudinal axis of the arm, said supporting arms positioned near the rear of the fuselage and said arms normally folded against said fuselage, and cables secured to said arms and also secured at their opposite ends to the fuselage at points slightly behind the plane passing through the center of wing-lift, housings at the outer end of the arms and air drags carried in said housings, means for simultaneously releasing said arms and means for synchronizing the rearward movement of said arms until they reach a position at right angles to the longitudinal central axis of the plane, the housings having apertures therethrough for allowing the air to force said drags to an open position after the arms have been released to thereby provide an air drag or resistance on the landing of the airplane.

5. In an airplane, two like lobe-shaped parachutes carried within the fuselage, means through which the air may rush for releasing the said parachutes and means holding the parachutes at right angles to the central longitudinal axis of the plane to thereby offer resistance to the airflow without affecting the stability of the plane and lessen the landing speed of the plane.

6. In an airplane, two lobe-shaped parachutes normally carried within the fuselage, means for supporting and holding the parachutes at right angles to the central longitudinal axis of the plane when said parachutes are released, means for simultaneously releasing said parachutes and the said parachutes offering a resistance to the air flow to thereby lessen the landing speed of the plane without affecting the stability of the same.

ARTHUR D. HANSSON.